(12) United States Patent
Fleury

(10) Patent No.: US 7,732,538 B2
(45) Date of Patent: Jun. 8, 2010

(54) METHOD FOR CARRYING OUT A MASS POLYMERIZATION

(75) Inventor: Pierre-Alain Fleury, Ramlinsburg (CH)

(73) Assignee: List Holding AG, Arisdorf (CH)

( * ) Notice: Subject to any disclaimer, the term of this patent is extended or adjusted under 35 U.S.C. 154(b) by 1031 days.

(21) Appl. No.: 10/545,470

(22) PCT Filed: Feb. 16, 2004

(86) PCT No.: PCT/EP2004/001431

§ 371 (c)(1), (2), (4) Date: Feb. 15, 2006

(87) PCT Pub. No.: WO2004/072131

PCT Pub. Date: Aug. 26, 2004

(65) Prior Publication Data

US 2006/0155087 A1 Jul. 13, 2006

(30) Foreign Application Priority Data

Feb. 14, 2003 (DE) .................. 103 06 613

(51) Int. Cl.
*C08F 2/02* (2006.01)

(52) U.S. Cl. ............. 526/88; 526/65; 526/319; 526/68; 526/329.7

(58) Field of Classification Search ........ None
See application file for complete search history.

(56) References Cited

U.S. PATENT DOCUMENTS

2004/0143075 A1* 7/2004 Fleury .................. 526/70

FOREIGN PATENT DOCUMENTS

GB          1 013 688  A      12/1965

OTHER PUBLICATIONS http://www.list.ch/articles/62_e.pdf.*
http://www.list.ch/articles/59_e.pdf.*

* cited by examiner

*Primary Examiner*—David Wu
*Assistant Examiner*—Vu Nguyen
(74) *Attorney, Agent, or Firm*—Bachman & LaPointe, P.C.

(57) ABSTRACT

A method for carrying out a mass polymerization of monomers and/or pre-polymers, which are at least partially soluble in their polymers, in particular methyl methacrylate (MMA) is provided. The method involves the addition of at least one monomer or pre-polymer in a reactor. Mass polymerization for amorphous polymers is carried out without solvents below the glass transition temperature and for crystalline polymers below the melting point, achieving a high degree of conversion of the monomers.

9 Claims, No Drawings

METHOD FOR CARRYING OUT A MASS POLYMERIZATION

BACKGROUND OF THE INVENTION (1) Field of the Invention

The invention relates to a method for carrying out a mass polymerization of monomers and/or prepolymers which are at least partly soluble in their polymers, in particular of methyl methacrylate (MMA), at least one monomer or prepolymer being metered into a reactor.

(2) Prior Art

The polymerization in a kneading reactor with or without solvent was also investigated and is described in DE 101 40 217.1/EP 10122571.7.

Polymerization is understood as meaning the conversion of low molecular weight compounds (monomers, oligomers) into high molecular weight compounds (polymers, macromolecules). Thus, the industrial production of polymers can be effected under heterogeneous or homogeneous conditions. Heterogeneous reactions are understood as meaning polymerization in suspension/emulsion, precipitation reactions and the fixed-bed procedure.

The suspension/emulsion polymerization methods are usually carried out in stirred vessels (viscosity is low). Large amounts of water and different additives are, however, required in order to produce segregation/heterogeneity.

The precipitation polymerization is frequently effected using thermodynamic separation of the polymer from its monomer and/or a solvent. A precondition for this is that the polymer is insoluble in the monomer or the solvent. In this method of production, the polymer is precipitated.

The continuous fixed-bed procedure operates with backmixing. The already reacted polymer is mixed back in the direction of metering. This gives a heterogeneous mixture between liquid metering and prepared (polymerized) product. The result is a heterogeneous granular polymer material in which the liquid monomer or prepolymer completely polymerizes around the solid particles, these solid particles already having been polymerized.

Homogeneous mass polymerization is understood as meaning that the polymer forms a homogeneous solution in its monomer. The first condition to be fulfilled is that the polymer is readily soluble in its monomer. Such a defined homogeneous polymerization system can also operate with the above-mentioned fixed-bed procedure, with the result that the polymerization method takes place heterogeneously in this case because the monomer or prepolymer metered in has no time properly to dissolve its back-mixed granular polymer. Here, the limitation is the diffusion of the monomer into the polymer particles.

During the homogeneous mass polymerization of methyl methacrylate (MMA) with high monomer conversion, the polymer forms a solid or highly viscous polymer material which can block or shut down any conventionally operated reactor (e.g. CSTR, stirred vessel).

In order to overcome these mixing problems (limitations of heat transfer and mass transfer lead to local overheating and concentration segregation) which are associated with the highly viscous polymer material, various possible methods were proposed in the prior art for the homogeneous polymerization of MMA. Among these useful possibilities were:

a) the polymerization with high monomer conversion carried out at high temperature in order to reduce the melt viscosity. However, some parameters, such as the ceiling temperature (at which an equilibrium occurs between polymerization and depolymerization), can influence this possibility (Fleury P. A., Meyer T., Renken A., Dechema (1992), Volume 127, VCH, "Methyl methacrylate polymerization in a tubular reactor: product quality and reactor behavior"). Sulzer Chemtec has, for example, developed a continuous, homogeneous polymerization of styrene and MMA (methyl methacrylate) in a circulation reactor having static mixing elements. This method requires high temperatures (>>Tg, well above the glass transition temperature) in order to keep the viscosity of the reaction material low and hence to avoid deposits on the reactor walls and on the mixing elements. However, such high temperatures have undesired side effects, for example the formation of oligomers or depolymerization. In the case of styrene, these side effects are not problematic; however, for MMA, the depolymerization begins at as low as 155° C. (stabilizers are then required).

b) Dilution of the polymerization mixture with a large amount of an inert, liquid phase (solvent), which prevents the solidification of the reaction material for the polymerization with high monomer conversion and at low/medium temperature (close to Tg). The disadvantage of this method is the necessity of providing an expensive separation step with solvent recovery/treatment. Moreover, the use of solvents results in both a lower molecular weight and a reduced polymerization rate. For quality reasons, the PMMA producers do not wish the presence of solvents.

c) Polymerization in a CSTR (continuous stirred tank reactor) without a solvent at a medium temperature (close to Tg) up to a maximum monomer conversion of from 50 to 60%. The monomer conversion is limited in order to avoid a run away reaction in which the Trommsdorff effect causes stability problems in a conventionally stirred tank reactor. The large amounts of unreacted monomer must be separated from PMMA in an extruder and recycled. This is the conventional preparation method.

SUMMARY OF THE INVENTION

The object of the present invention is to provide a mass polymerization of in particular MMA in the concentrated phase (with high monomer conversion and at low temperature), a kneading reactor being used in order to overcome the mixing problems discussed above (limitations of heat transfer and mass transfer lead to local overheating and concentration segregation). The low polymerization temperature is a guarantee of novel formulations which give the best product properties.

This object is achieved by carrying out the mass polymerization without a solvent below the glass transition temperature in the case of amorphous polymers or below the melting point in the case of crystalline polymers up to a high monomer conversion.

In a preferred embodiment, an initiator/catalyst can be metered into the monomer or prepolymer in the reactor. The initiator can be premixed with the monomer or prepolymer or metered in individually.

DETAILED DESCRIPTION OF THE PREFERRED EMBODIMENT(S)

The kinematics of kneading in the kneading reactor result in self-cleaning of the surfaces, which reduces or avoids dead zones and permits axial transport of the highly viscous polymerization material along the continuous reactor.

Twin-screw kneading reactors, as described, for example, in DE 199 40 521 A1/DE 101 50 900.6 or DE 41 18 884 A1/EP 0 853 491, are preferably used for carrying out the method according to the invention. These reactors have the advantage that a large vapor passage is provided for the evaporative cooling, in order to remove the heat of reaction and the kneading energy generated up to the granulation point.

The kneading reactors are optimized with respect to the self-cleaning and the avoidance of dead zones. Furthermore, the shape of the kneading bars has been chosen so that no compression zones occur on mutual engagement of the kneading bars or stirring bars. Consequently, the granulation of the homogeneous polymer material can be carried out without local overheating due to excessive kneading energy and milling effect (this also leads to undesired production of fine particles).

The entire method should take place continuously. Controlled, axial transport of the pasty material takes place. Various screw geometries can be chosen. The transport angles of the kneading bars can be adapted and serve for axial transport of the material in the reactor.

It is furthermore possible to install back-conveying zones which control the degree of filling in the reactor. Such back-conveying zones can also effect back-mixing, the PMMA already polymerized and the liquid metering (monomer or prepolymer) producing heterogeneous back-mixing (the diffusion of the monomer into the polymer particles is limited). This results in a heterogeneous, granular material in which the metered liquid is distributed around the solid PMMA particles. As a result, the polymerization takes place in a fixed bed (around the particles), with the advantage that the apparent viscosity is reduced and the measured specific torque is lower. This heterogeneous fixed-bed procedure could be advantageous if the torque of the homogeneous mass polymerization is too high or if polymer deposits on surfaces of the reactor are to be prevented.

Particularly in the case of methods and/or products which require a very long residence time in the kneading reactor, the kneading reactor can be loaded with a prepolymer instead of with monomers. This means that a prepolymerization is effected in a preceding process step (e.g. stirred vessel) before the actual polymerization in the kneading reactor.

Under sufficient self-cleaning conditions, homogeneous mass polymerization of MMA below the glass transition temperature of the polymer (Tg=105° C.) is possible. A liquid monomer or prepolymer is metered into the kneading reactor. During the polymerization along the kneading reactor, the viscosity increases considerably, often sixfold, up to the solid state of aggregation. In this state, the kneading reactor comminutes the polymer without a milling effect (significantly minimum fine fraction), which polymer is then discharged continuously as uniform granular solid polymer having free-flowing properties.

The polymerization is fairly exothermic (−55.2 kJ/mol) The large free cross-sectional region of the mixing reactor is ideal for removing the heat of reaction of the polymerization process through the evaporation of the liquid phase.

The homogeneous mass polymerization of MMA is carried out with high monomer conversion in a kneading reactor below the glass transition temperature. The high exothermicity is eliminated by evaporation of the monomer, preferably in vacuo (evaporative cooling), in order to control the product temperature. The evaporative cooling is a decisive parameter for the scale-up, particularly if the Trommsdorff effect or the gel effect occurs. The high monomer conversion range according to the invention of from 60 to 90% is characterized in that self-acceleration of the polymerization rate owing to the gel effect occurs, which, however, can be controlled particularly in a kneader, so that no run away effect occurs. The product temperature can be controlled in this monomer conversion range of from 60 to 90% only by the use of evaporative cooling. If the procedure is effected at below the glass transition temperature, the mass polymerization is stopped at about 90% monomer conversion owing to the glass effect.

The evaporated monomer is condensed externally and either recycled into the kneading reactor or reused in a preceding process step (e.g. stirred vessel for the prepolymerization).

EXAMPLE

In a twin-screw kneading reactor according to DE 41 18 884 A1, a homogeneous mass polymerization of MMA (methyl methacrylate) is carried out below the glass transition temperature (Tg=105° C.). The batch kneading reactor was filled with MMA as monomer and with Perkadox 16 (ElfAtochem) as initiator. The liquid material was flushed with nitrogen at 20° C. for 10 minutes. The wall temperature was then adjusted to 50° C. and the stirrer speed to 40/50 rpm.

After 75 minutes, the viscosity of the material had increased to such an extent that it wrapped around the stirring shafts. After 85 minutes, the polymer material began to granulate and was converted as a whole into free-flowing granules after 95 minutes. The kneading energy was measured in this conversion phase as 0.15 MJ/kg. The granules were discharged after 100 minutes and had the following properties:

Monomer conversion of about 90% (limited by glass effect)

Molar mass 315 000 g/mol (Mw)

Polydispersity index of 2.25.

The product temperature was controlled in the range from 45 to 56° C. by means of evaporative cooling (pressure about 300 mbar abs.). The variation of the amount of condensate and of the product temperature as a function of time indicates a strong Trommsdorff effect.

Scale-Up Considerations:

During the scale-up, the ratio of cooling area to kneading reactor volume becomes smaller (A/V). This means that the unconverted amounts of monomer (e.g. 10% during the pilot tests) in a production kneading reactor become smaller or have completely evaporated since more monomer has to be evaporated for cooling owing to the lower ratios of cooling area to volume. The result is an economical procedure in which the heat of reaction and the kneading energy introduced can be expediently used for the thermal separation of the residual monomer and polymer.

The invention claimed is:

1. A method for carrying out a mass polymerization of monomers and/or prepolymers which are at least partly soluble in their polymers, comprising the steps of:
    metering at least one monomer or prepolymer into a reactor;
    carrying out the mass polymerization without adding a solvent at any time and below the glass transition temperature in the case of amorphous polymers or below the melting point in the case of crystalline polymers up to a monomer conversion from 60 to 90%; and
    said carrying out step comprising eliminating exothermicity by evaporating the at least one monomer so as to control product temperature and using evaporative cooling to control said product temperature so as to convert said 60 to 90% of said monomer and to stop said conversion so that said conversion is not greater than 90%.

2. The method as claimed in claim 1, further comprising metering an initiator/catalyst into the reactor containing the at least one monomer or prepolymer.

3. The method as claimed in claim 1, further comprising effecting polymerization directly up to the granular state.

4. The method as claimed in claim 1, further comprising agitating the material in the reactor.

5. The method as claimed in claim 4, further comprising avoiding or keeping small compression zones during the agitation of the material in the reactor.

6. The method as claimed in claim 1, further comprising carrying out the polymerization continuously.

7. The method as claimed in claim 1, further comprising granulating the material in the reactor.

8. The method as claimed in claim 1, further comprising effecting the polymerization in a one-screw or twin-screw kneading reactor.

9. The method as claimed in claim 1, further comprising effecting prepolymerization in a vessel, before the polymerization in the reactor.

* * * * *